United States Patent
Edwards (10) Patent No.: US 8,138,751 B2
(45) Date of Patent: *Mar. 20, 2012

(54) MAGNETIC ROTATION SENSING FOR METER

(75) Inventor: Bruce H. Edwards, Johns Creek, GA (US)

(73) Assignee: Cellnet Innovations, Inc., Alpharetta, GA (US)

(*) Notice: Subject to any disclaimer, the term of this patent is extended or adjusted under 35 U.S.C. 154(b) by 445 days.

This patent is subject to a terminal disclaimer.

(21) Appl. No.: 12/237,884

(22) Filed: Sep. 25, 2008

(65) Prior Publication Data

US 2010/0072990 A1    Mar. 25, 2010

(51) Int. Cl.
G01B 7/30 (2006.01)
(52) U.S. Cl. .................................. 324/207.25
(58) Field of Classification Search ............ 324/207.25, 324/207.2; 340/870.01, 870.02, 870.03
See application file for complete search history.

(56) References Cited

U.S. PATENT DOCUMENTS

| | | |
|---|---|---|
| 4,275,291 A | 6/1981 | Feller |
| 4,296,411 A | 10/1981 | Romanelli et al. |
| 4,607,527 A | 8/1986 | Sears |
| 4,728,950 A * | 3/1988 | Hendrickson et al. ..... 340/870.31 |
| 5,721,383 A * | 2/1998 | Franklin et al. ............ 73/861.77 |
| 7,113,063 B2 | 9/2006 | Romanik et al. |
| 2005/0068133 A1* | 3/2005 | Romanik et al. ............... 335/207 |
| 2006/0103546 A1* | 5/2006 | Salser et al. .............. 340/870.02 |
| 2007/0109209 A1* | 5/2007 | Winter .......................... 343/719 |

OTHER PUBLICATIONS

U.S. Appl. No. 12/237,841, filed Sep. 25, 2008.

* cited by examiner

Primary Examiner — Reena Aurora
(74) Attorney, Agent, or Firm — Kilpatrick Townsend & Stockton LLP (57) ABSTRACT

Embodiments for rotation sensing are provided. A device may include a magnet apparatus including a first and a second magnet. The magnet apparatus may be configured to be coupled to a dial apparatus of a meter. The device may include a first magnetic field sensor and a second magnetic field sensor configured to be coupled to a dial cover. The magnetic field sensors may generate signals based upon the sensed magnetic fields. In some embodiments, the device may include logic for counting rotations and/or logic for detecting abnormal conditions such as a missing dial hand, missing dial cover, magnetic tampering and/or malfunctioning magnetic field sensors.

19 Claims, 8 Drawing Sheets

MAGNETIC ROTATION SENSING FOR METER

TECHNICAL FIELD

Embodiments discussed herein are generally related to utility meters and, more particularly, are related to magnetic rotation sensing of a dial apparatus in a meter.

BACKGROUND

Utility meters are used by utility companies to measure the amount of a resource consumed by users. The resource may be gas, electricity, water, etc. Such meters may be located at the consumer's premises, which may be commercial or residential. These meters include a rotation device that indicates the amount of a resource consumed. For some utility meters, this rotation device may be referred to as a dial, an index, and/or a register. The meters may be configured so that a volume of the resource passing through a metering valve is proportional to the number of rotations of the rotation device, and the dial, index, and/or register may indicate the amount of consumption of the resource according to the number the rotations of the rotating device.

Additionally, the number of rotations of the rotating device may be sensed. Under current rotation sensing techniques, tampering of the meter may be difficult to detect. More specifically, if someone tampers with the meter by removing a dial cover or by placing a magnet near the meter, the tampering is difficult to detect because often utility meters have zero-use as a normal state. Similarly, with these techniques, it may be difficult to detect a malfunction. As a nonlimiting example, in the case of meters employing a dial hand to indicate consumption, if the dial hand falls off the utility meter, the dial will revert to zero. Because meters may have zero-use as a normal state, it can be difficult to remotely detect that a dial hand has fallen off the meter, and lost revenue can result.

SUMMARY

Embodiments of the present disclosure provide for rotation sensing. In some embodiments, the rotation sensing device may include a magnet apparatus comprising a first magnet and a second magnet. The magnet apparatus may be configured to be coupled to a dial apparatus of a meter. The rotation sensing device may also include a first magnetic field sensor configured to be coupled to a dial cover. When the first magnetic field sensor is coupled to the dial cover, the distance between the first magnet of the magnet apparatus and the first magnetic field sensor is a function of the magnetic field strength of the first magnet and a sensitivity of the first magnetic field sensor. The rotation sensing device may also include a second magnetic field sensor configured to be coupled to a dial cover. When the second magnetic field sensor is coupled to the dial cover, the distance between the second magnetic field sensor and the first magnet is a function of the magnetic field strength of the first magnet and the sensitivity of the second magnetic field sensor. The first magnetic field sensor is configured to generate a first signal based upon the sensed magnetic field of the first magnet and the second magnetic field sensor is configured to generate a second signal based upon the sensed magnetic field of the first magnet.

In some embodiments, a method for sensing the rotation of a dial apparatus of a metering device is provided. The method may include generating a first magnetic field and a second magnetic field that varies according to the rotation of a dial apparatus. The method may also include sensing, using a magnetic field sensor, the generated first magnetic field when the first magnetic field sensor is within a magnetic field sensing distance of the first magnetic field. The method may further include sensing, using a second magnetic field sensor, the generated first magnetic field when the second magnetic field sensor is within a magnetic field sensing distance of the generated first magnetic field. The method may also include receiving a first signal corresponding to the sensing of the magnetic field sensor and receiving a second signal corresponding to the sensing of the second magnetic field sensor. Also, the method may include detecting an abnormal condition based on the received first signal and the received second signal.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the disclosure may be better understood with reference to the following drawings. The components in the drawings are not necessarily to scale, emphasis instead being placed upon illustrating the principles of the present disclosure. Moreover, in the drawings, like reference numerals designate corresponding parts throughout the several views.

DETAILED DESCRIPTION

Meters may include a rotation device that indicates the amount of a resource consumed. For some utility meters, this rotation device may be referred to as a dial, an index, and/or a register. The meters may be configured so that the volume of the resource passing through a metering valve, as a nonlimiting example, is proportional to the number of rotations of the rotation device, and the dial, index and/or register may indicate the amount of consumption of the resource according to number the rotations of the rotating device. To simplify the present disclosure, the rotation device will be referred to hereinafter as a dial.

Figure 1:
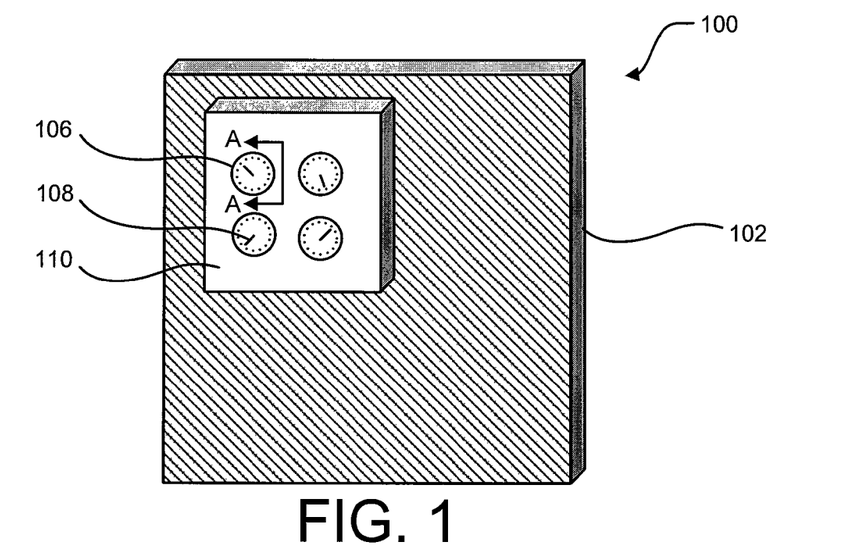
FIG. 1 is a front perspective view of an exemplary metering device.

FIG. 1 is a front perspective view of one nonlimiting example of a metering device 100. The metering device 100 may include one or more of a meter 102, a dial 106, a dial hand 108, and/or a dial cover 110. As a resource is consumed, the dial hand 108 may rotate proportional to consumption and indicate the amount consumed by pointing to a number on the dial 106.

Figure 2:
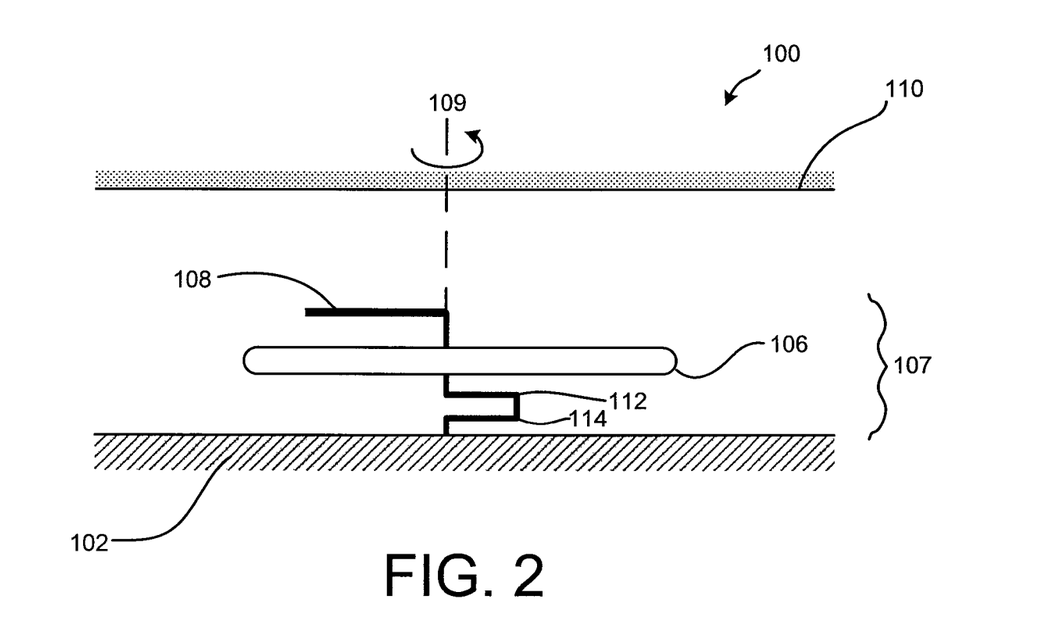
FIG. 2 is a cross-sectional view of the metering device illustrated in FIG. 1.

FIG. 2 illustrates a cross-sectional view of the exemplary metering device 100 illustrated in FIG. 1 as seen through the line denoted "A." In this view, the coupling of the dial 106 to a meter-drive-to-dial linkage 112 and a meter drive 114 can be seen. In some cases the meter drive 114 may be referred to as the "wriggler" or the "dog." Also coupled to the dial 106 may be the dial hand 108. The combination of the dial hand 108, the dial 106, the meter-drive-to-dial linkage 112, and meter drive 114 is hereinafter referred to as a dial apparatus 107. The dial 106, the dial hand 108, and the meter-drive-to-dial linkage 112 may be configured to rotate about an axis of rotation 109. Although the rotation about the axis of rotation 109 is depicted as being counter-clockwise in FIG. 2, the axis of rotation 109 may be a clockwise rotation. Also shown is the dial cover 110, which may be configured to shield the dial 106 from weather, flying debris, and/or otherwise protect the dial apparatus 107.

Figure 3:
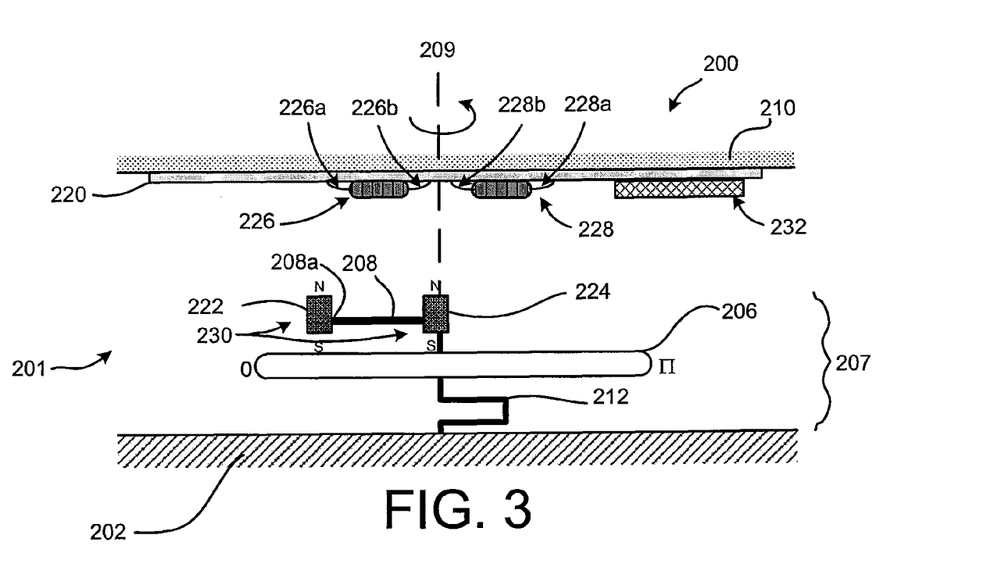
FIG. 3 is a cross-sectional view of the metering device illustrated in FIG. 1 including an installation of an exemplary embodiment of the rotation sensing configuration.

FIG. 3 illustrates an exemplary embodiment, among others, of a rotation sensing configuration 201 installed on a metering device 200. In this embodiment, the rotation sensing configuration 201 may include a magnet apparatus 230 comprising a first magnet 222 and a second magnet 224. The magnet apparatus 230 may also include a structure for coupling the first magnet 222 and the second magnet 224 to a dial apparatus 207. This coupling may include glue, an adhesive, a screw, a slide clip, a housing, and/or one or more of a variety of other coupling means. The first magnet 222 may include an electromagnet or a permanent magnet such as neodymium, and the second magnet 224 may include an electromagnet or a permanent magnet as well. Further, the first magnet 222 and the second magnet 224 may be coupled to the dial apparatus 207 such that their polarity may be similar. As a nonlimiting example, FIG. 3 illustrates the northern pole of each magnet as facing a dial cover 210. In some embodiments, the the first magnet 222 may be coupled to a peripheral end 208a of a dial hand 208, and second magnet 224 may be coupled the end of the dial hand 208 proximate to the axis of rotation 209.

The rotation sensing configuration 201 may also include a first magnetic field sensor 228 and a second magnetic field sensor 226 coupled to a printed circuit board 220. The printed circuit board 220 may be configured to be coupled to a dial cover 210 as well. The first magnetic field sensor 228 may include a peripheral end 228a and a central end 228b. Likewise, the second magnetic field sensor 226 may include a peripheral end 226a and a central end 226b. In some embodiments, such as the nonlimiting example depicted in FIG. 3, a processing unit 232 may be located locally with respect to the first magnetic field sensor 228 and the second magnetic field sensor 226, and the processing unit 232 may be coupled to the printed circuit board 220. In addition, the processing unit 232 may be coupled to the first magnetic field sensor 228 and a second magnetic field sensor 226 using the printed circuit board 220. Still, in some embodiments, the processing unit 232 may be located remotely from the first magnetic field sensor 228 and the second magnetic field sensor 226. Similarly, the processing unit 232 may be in communication with the first magnetic field sensor 228 and the second magnetic field sensor 226 via a wire, cable, or one or more of a variety of connecting devices. It may be useful to locate the processing unit 232 in a location remote from the first magnetic field sensor 228 and the second magnetic field sensor 226 in order to avoid obscuring a view of the dial apparatus 207.

Also, the first magnetic field sensor 228 and the second magnetic field sensor 226 may include reed switches. A reed switch may include an electrical switch operated by an applied magnetic field. The reed switch may contain two ferrous metal reeds, which are magnetizable and electrically conductive, and these two ferrous metal reeds may be at least partially enclosed by glass. If the reed switches are normally-open, a small gap may separate the end portions of the two reeds when the switch is open. When a magnetic field is applied, the magnetic field may cause the contacts to pull together, which closes the electrical circuit. When the magnetic field is no longer applied, the stiffness of the reeds may cause them to separate and thus, open the circuit. Similarly, some embodiments may be configured to accommodate normally-closed reed switches.

Figure 4:
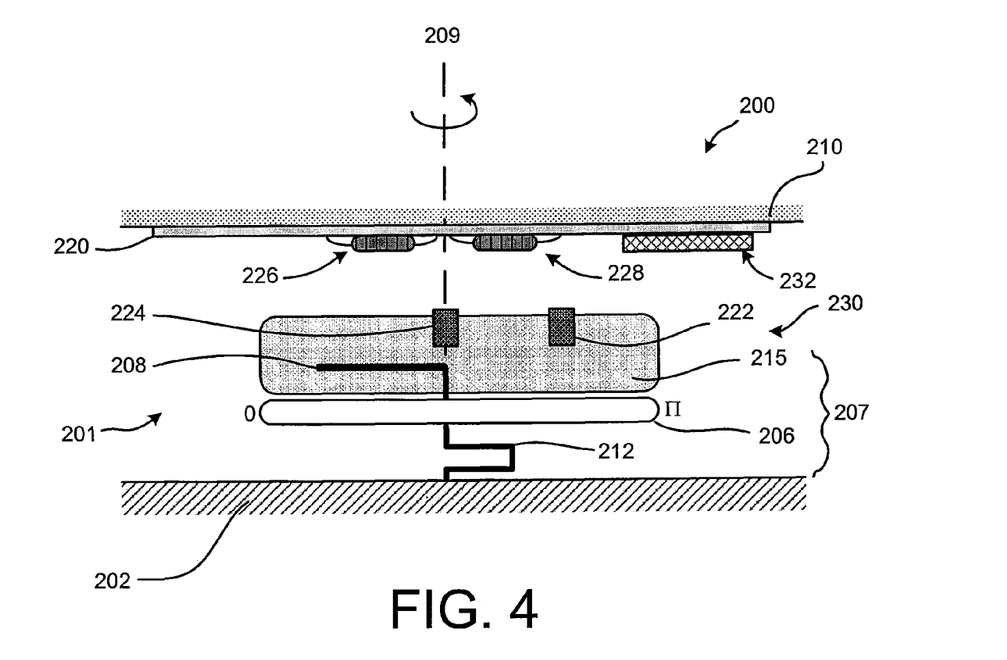
FIG. 4 is a cross-sectional view of the metering device illustrated in FIG. 1, including an installation of another exemplary embodiment of the rotation sensing configuration.

FIG. 4 is a cross-sectional view of the metering device 200 including an installation of another exemplary embodiment of the rotation sensing configuration including two magnets and two sensors. In some embodiments, the magnet apparatus 230 may further comprise a housing 215 as depicted in the non-limiting example shown in FIG. 4. The housing 215 may enclose the dial hand 208 of the dial apparatus 207 loosely or more rigidly in accordance with the situation. The magnets 222, 224 may be positioned on the magnet apparatus 230 such that as the dial hand 208 rotates about the axis of rotation 209, the magnets 222, 224 may also rotate about the axis of rotation 209. This housing 215 may be made of plastic and/or another non-magnetic material that may be light enough not to cause the dial hand 208 to fall off the dial apparatus 207.

When the rotation sensing configuration 201 is installed on the metering device 200, the first magnetic field sensor 228 and the second magnetic field sensor 226 may be positioned at a distance from the magnet apparatus 230 that is a function of the strength of the magnets 222, 224 on the magnet apparatus 230 and the sensitivity of the first magnetic field sensor 228 and the second magnetic field sensor 226. The selection of magnets 222, 224 (e.g., according to magnetic field strength) and/or the magnetic field sensors 226, 228 (e.g., according to sensitivity) may be a function of the distance from the dial apparatus 207, the dial hand 208, the dial 206, and/or the meter drive-to-dial linkage 212 to the dial cover 210.

For example, in some embodiments, when the first magnetic field sensor 228 is coupled to the dial cover 210, a distance between the first magnet 222 of the magnet apparatus 230 and the first magnetic field sensor 228 may be a function of a magnetic field strength of the first magnet 222 and a sensitivity of the first magnetic field sensor 228. Also, when the second magnetic field sensor 226 is coupled to the dial cover 210, a distance between the second magnetic field sensor 226 and the first magnet 222 may be a function of the magnetic field strength of the first magnet 222 and the sensitivity of the second magnetic field sensor 226.

Once the rotation sensing configuration 201 is installed on the metering device 200, the rotation sensing configuration 201 may operate such that as the dial apparatus 207 rotates about the axis of rotation 209, the first magnetic field sensor 228 and the second magnetic field sensor 226 may sense a periodic, varying magnetic field. The first magnetic field sensor 228 and the second magnetic field sensor 226 may output a two-bit digital signal based upon the sensed magnetic fields of the first magnet 222 and the second magnet 224. The two-bit digital signal may include a first signal and a second signal.

Figure 5:
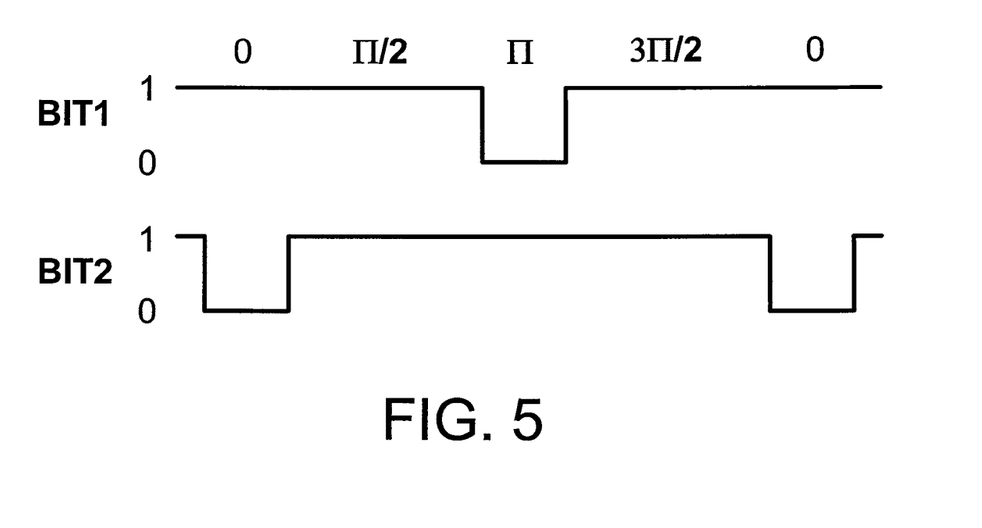
FIG. 5 is a diagram illustrating a digital signal output of the exemplary embodiment illustrated in FIG. 3 versus radial position.

FIG. 5 illustrates a nonlimiting example of a first signal and a second signal, which may be generated by the first magnetic field sensor 228 and the second magnetic field sensor 226, respectively, of the exemplary embodiment depicted in FIG. 3. In this nonlimiting example, the magnetic field sensors 226, 228 may be normally-open, and the magnets 222, 224 may have similar magnetic field strengths. In FIG. 5, the first signal generated by the first magnetic field sensor 228 may correspond to the bit of the digital signal identified as BIT1, and the second signal generated by the second magnetic field sensor 226 may correspond to BIT2. When a magnetic field sensor 226, 228 is closed, the corresponding bit may be at "1," and when the magnetic field sensor 226, 228 is open, the corresponding bit may be at "0."

When the dial hand 208 points to the radial position labeled "0," a peripheral end 226a of the second magnetic field sensor 226 may be proximate to the first magnet 222 and a central end 226b of the second magnetic field sensor 226 may be proximate to the second magnet 224. When both of the magnets 222, 224 are proximate to both of the ends 226a, 226b of the second magnetic field sensor 226, the magnetic field across the second magnetic field sensor 226 is equalized, which may cause the normally-open magnetic field sensor to be open. When the second magnetic field sensor 226 is open, no current will flow and thus BIT2 will be at "0" when the dial hand 208 points to the radial position "0." In contrast, when the dial hand 208 points to "0," the first magnetic field sensor 228 may be closed because only one end, the central end 228b, of the first magnetic field sensor 228 is proximate to a magnet, the second magnet 224. Thus, current may flow in the first magnet field sensor 228 and BIT1 may be at "1."

As the dial hand 208 rotates about the axis of rotation 209 and away from radial position "0," the first magnetic field sensor 228 may remain closed since the central end 228b continues to be proximate to the second magnet 224. The second magnetic field sensor 226 changes to a closed state since it, too, will only have one end, the central end 226b proximate to a magnet, which is the second magnet 224. Accordingly, BIT1 may remain at "1" while BIT2 changes to "1" at "π/2." So, when the dial hand 208 passes the "π/2" radial position, both BIT1 and BIT2 may be at "1."

As the dial hand 208 rotates toward the "π" position, the second magnetic field sensor 226 may remain closed and the first magnetic field sensor 228 may open causing BIT1 to read a "0" since the peripheral end 228a of first magnetic field sensor 228 will be proximate to the first magnet 222 and the central end 228b of the first magnetic field sensor 228 will be proximate to the second magnet 224. However, BIT2 will continue to be at "1" because the second magnet 224 will be at the central end 226b of the second magnetic field sensor 226. Then as the dial hand 208 rotates toward the "3π/2" position, the first magnetic field sensor 228 may close and both BIT1 and BIT2 may be at "1." As the dial hand 208 rotates about the axis of rotation 209 back toward radial position "0," BIT2 may change to "0" again while BIT1 remains at "1." As can be seen from the foregoing discussion, BIT1 and BIT2 may change periodically, and at any radial position of the dial hand 208, one of the bits may be at "1."

Referring again to FIGS. 3 and 4, the rotation sensing configuration 201 may also operate to detect an abnormal condition using a processing unit 232 coupled to the first magnetic field sensor 228 and the second magnetic field sensor 226 on the printed circuit board 220. The detected abnormal condition may be one of a variety of abnormal conditions such as magnetic tampering, a missing dial hand 208, a missing dial cover 210, and/or a malfunctioning glass reed switch. In addition, the rotation sensing configuration may also operate to count the number of rotations of the dial apparatus 207 using the processing unit 232.

Figure 6:
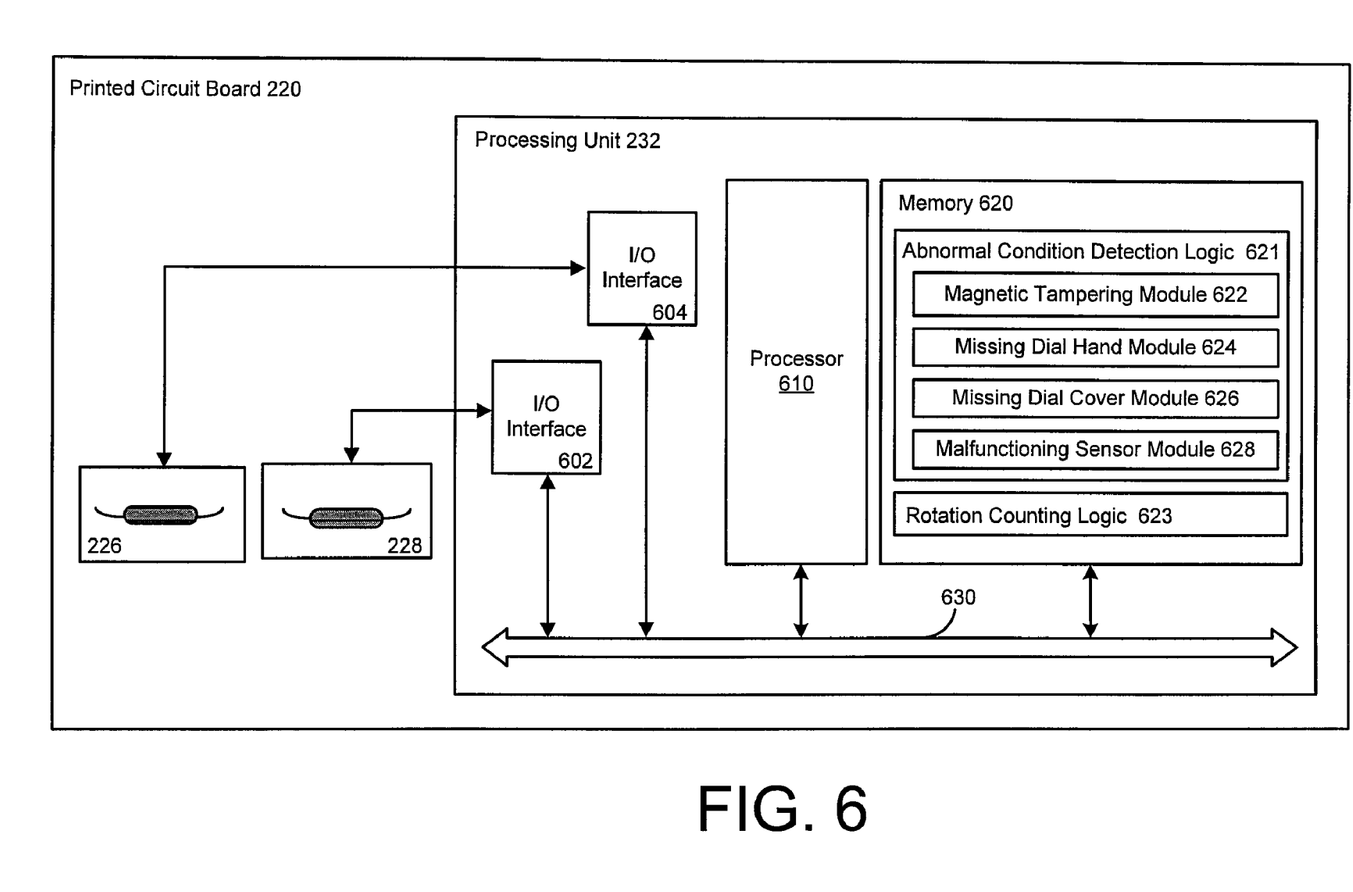
FIG. 6 is a block diagram illustrating a nonlimiting example of a processing unit of a rotation sensing configuration.

FIG. 6 is a block diagram illustrating a nonlimiting example of a processing unit 232 of the rotation sensing configuration 201 illustrated in FIGS. 3 or 4. The processing unit 232 may include a processor 610, a memory 620, a bus 630, a first I/O interface 602 and a second I/O interface 604. Also, the processor 610, the memory 620, the first I/O interface 602 and the second I/O interface 604 may be coupled to the bus 630. The processing unit 232 as well as a first magnetic field sensor 228 and a second magnetic field sensor 226 may be coupled to a printed circuit board 220. Also, the first magnetic field sensor 228 may be coupled to the first I/O interface 602, and the second magnetic field sensor 226 may be coupled to the second I/O interface 604. The memory 620 may include abnormal condition detection logic 621 and/or rotation counting logic 623. In the nonlimiting example illustrated in FIG. 6, the abnormal condition detection logic 621 may include a magnetic tampering module 622, a missing dial hand module 624, a missing dial cover module 626, and/or a malfunctioning sensor module 628. The abnormal condition detection logic 621 may include more or fewer modules than those illustrated. However, in some embodiments, the processing unit 232 may be located remotely from the location of first magnetic field sensor 228 and the second magnetic field sensor 226, and the processing unit 232 may not be coupled to the printed circuit board 220. It may be useful to locate the processing unit 232 in a location remote from the location of the first magnetic field sensor 228 and the second magnetic field sensor 226 in order to avoid obscuring a view of the dial apparatus 207.

Referring again to FIGS. 3, 4, 5 and 6, the detection of the abnormal condition of magnetic tampering will be discussed. When magnetic tampering occurs, the presence of an external magnet may cause one or more of the magnetic field sensors (226 or 228) to stay in either the open or closed position while the other magnetic field sensor (226 or 228) is opening and closing. A magnetic tampering module 622 of the abnormal condition detection logic 621 may detect the condition of magnetic tampering by determining that one of the bits remains at a logical value of "1" or "0" while the other bit changes periodically, depending on whether the magnetic field sensors 226, 228 are normally open or normally closed and depending on the polarity of the applied external magnet. If the external magnet is strong enough, both magnetic field sensors 226, 228 may stay in the open position or both magnetic field sensors 226, 228 may stay in the closed position. The magnetic tampering module 622 may detect the condition of magnetic tampering by determining that both BIT1 and BIT2 remain at a logical value of "1" or "0," depending on whether the magnetic field sensors 226, 228 are normally open or normally closed and depending on the polarity of the applied external magnet.

The abnormal condition of a missing dial hand 208 may be detected as well. This paragraph refers to FIGS. 3, 4, 5 and 6, the abnormal condition of a missing dial hand 208 will be discussed. When the rotation sensing configuration 201 is installed and then the dial hand 208 subsequently is removed or falls off, the abnormal condition of a missing dial hand 208 occurs. When the dial hand 208 is missing, the dial hand 208 and the coupled magnet apparatus 230 are no longer coupled to the remainder of the dial apparatus 207. Additionally, when this abnormal condition occurs, the magnetic field sensors 226, 228 may no longer be able to sense the first magnetic field and the second magnetic field generated by the first magnet 222 and the second magnet 224 on the magnet apparatus 230 because the magnet apparatus 230 has moved out of a sensing distance from the first magnetic field sensor 228 and the second magnetic field sensor 226. Both magnetic field sensors 226, 228 may stay in the open position when using normally-open field sensors or both magnetic field sensors 226, 228 may stay in the closed position when using normally-closed magnetic field sensor. The a missing dial hand module 624 of the abnormal condition detection logic 621 may detect the condition of a missing dial hand 208 by determining that BIT1 and BIT2 are both at a logical value of "1 or both at a logical value of "0."

Again, referring to FIGS. 3, 4, 5 and 6, which illustrate the rotation sensing configuration 201 when installed, the detection of the abnormal condition of a missing dial cover 210 will be discussed. When the dial cover 210 is missing, the first magnetic field sensor 228 and second magnetic field sensor 226 may no longer be within a sensing distance of the magnet apparatus 230. Thus, the magnetic field sensors 226, 228 may no longer be able to sense the first magnetic field and the second magnetic field generated by the first magnet 222 and the second magnet 224 on the magnet apparatus 230. Both magnetic field sensors 226, 228 may stay in the open position when using normally-open magnetic field sensors or both magnetic field sensors 226, 228 may stay in the closed position when using normally-closed magnetic field sensors. A missing dial cover module 626 of the abnormal condition detection logic 621 may detect the condition of a missing dial cover 210 by determining that BIT1 and BIT2 are both at a logical value of "1" or both at a logical value of "0."

Further, the abnormal condition of a malfunctioning glass reed switch may be detected. This paragraph refers to FIGS. 3, 4, 5 and 6 and discusses the rotation sensing configuration 201 and the abnormal condition of a magnetic field sensor (228 or 226) malfunction. The malfunction may occur when the magnetic field sensor (228 or 226) of the rotation sensing configuration 201 includes a glass reed switch. Glass reed switches may be susceptible to damage, and detecting the damage (e.g. malfunction) of a glass reed switch may be useful. The a malfunctioning sensor module 628 of the abnormal condition detection logic 621 may detect the condition of a malfunctioning magnetic field sensor (228 or 226) by determining that BIT1 and BIT2 are both at a logical value of "1" or both at a logical value of "0."

Further, in some cases, when a glass reed switch malfunctions, one of the magnetic field sensors 226, 228 may be stuck in the open position. As the dial apparatus 207 rotates, an invalid state may occur where both BIT1 and BIT2 are at "0." The malfunctioning sensor module 628 may be configured to detect the abnormal condition of a malfunctioning glass reed switch by determining that BIT1 and BIT2 are both at a logical value of "0" at the same time.

In some cases, when a glass reed switch malfunctions, one of the magnetic field sensors 226, 228 may be stuck in the closed position. As the dial apparatus 207 rotates, the other non-malfunctioning magnetic field sensor (226 or 228) may open and close periodically. The malfunctioning sensor module 628 may be configured to detect the abnormal condition of a malfunctioning glass reed switch by determining that one of the bits remains at a logical value of "1" while the other bit changes from a logical value of "0" to "1" and/or "1" to "0" with a periodicity that is distinguishable from random closures to due play in the mechanical linkage.

In addition to logic for detecting one or more of the conditions described above, the processing unit 232 of the rotation sensing configuration 201 may also include rotation counting logic 623 configured to count the number of rotations of the dial apparatus 207. Instead of merely counting the opening and closing of either the first magnetic field sensor 228 or the second magnetic field sensor 226 to determine the number of rotations of the dial apparatus 207, the rotation counting logic 623 may count the number of rotations in a manner that avoids counting noise in the first signal and/or the second signal caused by mechanical play in the rotation. In some embodiments, mechanical play in the rotation may occur due to mechanical play in the meter 202, the meter-drive-to-dial-linkage 212. Similarly, in some embodiments, such as the nonlimiting example depicted in FIG. 4, the housing 215 to dial hand 208 linkage may create mechanical play in the rotation as the dial apparatus 207 rotates about the axis of rotation 209.

In some embodiments, the rotation counting logic 623 may be configured such that, responsive to one of the sensors (228 or 226) opening, the rotation counting logic 623 may wait for the other sensor (226 or 228) to open while ignoring the opening or closing of the sensor (228 or 226) that has already opened. When the other sensor (226 or 228) opens, this may be thought of as a beginning of a full rotation for counting purposes. Also, the rotation counting logic 623 may be configured such that, responsive to the other sensor (226 or 228) opening, the rotation counting logic 623 may wait again for the previously opened sensor (228 or 226) to open again while ignoring the other sensor (226 or 228). Further, the rotation counting logic 623 may be configured such that, responsive to the previously opened sensor (228 or 226) has opening again, the rotation counting logic 623 may wait again for the other sensor (226 or 228) to open again while ignoring the opening or closing of the sensor that has already opened twice (228 or 226). When the other sensor (226 or 228) opens again, a full rotation of the dial apparatus 207 may be thought of as having occurred, and the rotation counting logic 623 may increment a counting number. Still, in some embodiments, the opening of one of the sensors (228 or 226) may be the thought of as a beginning of a full rotation for counting purposes, and when the one of the sensors (228 or 226) opens again, a full rotation of the dial apparatus 207 may be thought of as having occurred.

Similarly, in at least one nonlimiting example, the rotation counting logic 623 may wait for a first magnetic field sensor 228 to open while ignoring the opening or closing of a second magnetic field sensor 226. The rotation counting logic 623 may be configured such that, responsive to the first magnetic field sensor 228 opening, the rotation counting logic 623 may wait for the second magnetic field sensor 226 to open while ignoring the opening or closing of the first magnetic field sensor 228. The opening of the second magnetic field sensor 226 may be thought of as a beginning of a full rotation of the dial apparatus 207 for counting purposes.

The rotation counting logic 623 may be configured such that, responsive to the second magnetic field sensor 226 opening, the rotation counting logic 623 may wait again for the first magnetic field sensor 228 to open while ignoring the opening or closing of the second magnetic field sensor 226. The rotation counting logic 623 may be configured such that, responsive to the first magnetic field sensor 228 has opening again, the rotation counting logic 623 may wait again for the second magnetic field sensor 226 to open again while ignoring the opening and closing of the first magnetic field sensor 228. Responsive to the second magnetic field sensor 226 opening again, the rotation counting logic 623 may increment a counting number because a full rotation may have occurred. Still, in some embodiments, the opening of first magnetic field sensor 228 may be the thought of as a beginning of a full rotation for counting purposes, and when the first magnetic field sensor 228 opens again, a full rotation of the dial apparatus 207 may be thought of as having occurred.

By ignoring one of the sensors (226 or 228) for a rotation segment (e.g. a half rotation) according to the rotation counting logic 623 described above, the noise present in the signal corresponding to the ignored sensor (226 or 228) is not used in calculating the number of rotations. In this manner, the effects of mechanical play in the rotation on the counting of the rotations may be mitigated.

In some embodiments, the rotation counting logic 623 may be configured such that (e.g. assuming the magnetic field sensors 228, 226 are normally-open), responsive to one of the bits (BIT1 or BIT2) obtaining a logical value of "0," the rotation counting logic 623 may wait for the other bit (BIT2 or BIT1) to obtain a logical value of "0" while ignoring the changing of the other bit (BIT1 or BIT2) that has already obtained a logical value of "0." When the other bit (BIT2 or BIT1) has obtained a logical value of "0," this may be thought of as the beginning of a full rotation for counting purposes. The rotation counting logic 623 may be configured such that, responsive to the other bit (BIT2 or BIT1) obtaining a logical value of "0," the rotation counting logic 623 may wait again for the bit previously having a logical value of "0" (BIT1 or BIT2) to obtain a logical value of "0" again while ignoring the other bit (BIT2 or BIT1). The rotation counting logic 623 may be further configured such that, responsive to the bit previously having obtained a logical value of "0" (BIT1 or BIT2) obtaining a logical value of "0" again, the rotation counting logic 623 may wait again for the other bit (BIT2 or BIT1) to obtain a logical value of "0" again while ignoring the changing of the bit that has already obtained a logical value of "0" twice (BIT1 or BIT2). When the other bit (BIT2 or BIT1) has obtained a logical value of "0" again, a full rotation may be thought of as having occurred, and the rotation counting logic 623 may increment a counting number responsive to the other bit (BIT2 or BIT1) obtaining a logical value of "0" again. Still, in some embodiments, the obtaining of a logical value of "0" by one of the bits (BIT1 or BIT2) may be the thought of as a beginning of a full rotation for counting purposes, and when the one of the bits (BIT1 or BIT2) obtains a logical value of "0" again, a full rotation of the dial apparatus 207 may be thought of as having occurred.

In a nonlimiting example, the rotation counting logic 623 may be configured to wait for BIT1 to obtain a logical value of "0" while ignoring the changing of BIT2. Responsive to BIT1 has obtaining a logical value of "0," the rotation counting logic 623 may wait for BIT2 to obtain a logical value of "0" while ignoring the changing of BIT1. The changing of BIT2 to obtain a logical value of "0" may be thought of as the beginning of a full rotation. Responsive to BIT2 obtaining a logical value of "0," the rotation counting logic 623 may wait again for BIT1 to obtain a logical value of "0" again while ignoring the changing of BIT2. Responsive to BIT1 obtaining a logical value of "0" again, the rotation counting logic 623 may wait again for BIT2 to obtain a logical value of "0" again while ignoring the changing of BIT1. Responsive to BIT2 obtaining a logical value of "0" again, a full rotation may have occurred, and the rotation counting logic 623 may increment a count number and/or value. Still, in some embodiments, the obtaining of a logical value of "0" by the first bit (BIT1) may be the thought of as a beginning of a full rotation for counting purposes, and when first bit (BIT1) obtains a logical value of "0" again, a full rotation of the dial apparatus 207 may be thought of as having occurred.

By ignoring one of the bits (BIT1 or BIT2) for a rotation segment (e.g. a half rotation) according to the rotation counting logic 623 described above, the noise present in the signal corresponding to the ignored bit (BIT1 or BIT2) due to mechanical play in the rotation is not used in calculating the number of rotations. In this manner, the effects of mechanical play in the rotation on the counting of the rotations may be mitigated.

The embodiments described herein can be used in a variety of applications. For example, the embodiments may be used in utility meters, and/or these meters may be residential gas meters or commercial gas meters. These embodiments may also be used in other rotating mechanical devices where rotation sensing is useful.

Figure 7:
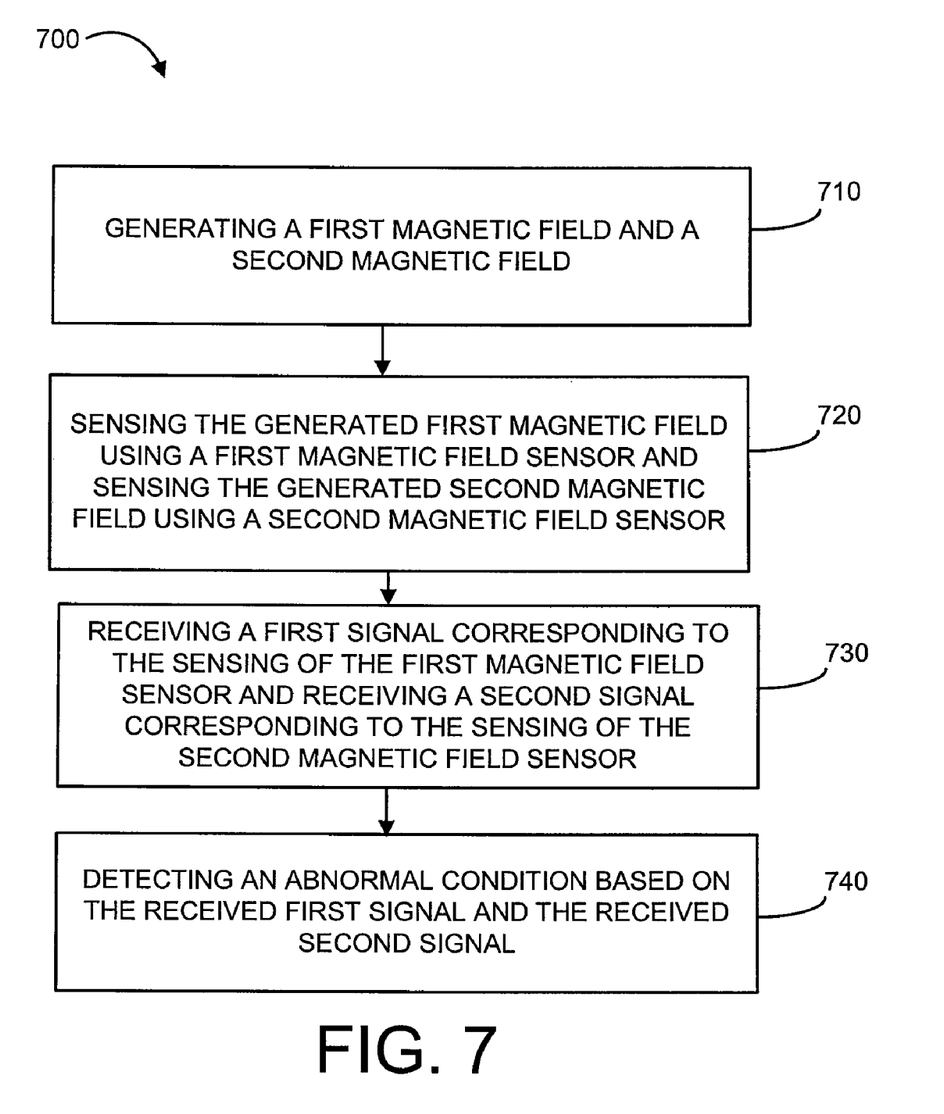
FIG. 7 is a flow chart illustrating an exemplary embodiment of a method for rotation sensing.

FIG. 7 illustrates one exemplary embodiment, among others, of a process 700 for sensing the rotation of a dial apparatus 207 of a metering device 200 shown, for example, in the nonlimiting embodiments illustrated in FIGS. 3, 4, 5, and/or 6. FIG. 7 includes blocks 710, 720, 730 and/or 740. In block 710, a first magnetic field and a second magnetic field are generated. These magnetic fields may be generated using a magnet apparatus 230. The magnet apparatus 230 may be coupled to a dial apparatus 207. The magnet apparatus 230 may comprise a first magnet 222 and a second magnet 224. The first magnet 222 may be positioned offset from the axis of rotation 209. The second magnet 224 may be positioned proximate to the axis of rotation 209 of the dial apparatus 207. The first magnet 222 of the magnet apparatus 230 may generate the first magnetic field, and the second magnet 224 of the magnet apparatus 230 may generate the second magnetic field. The first magnetic field and the second magnetic field may vary according to the rotation of the dial apparatus 207.

In block 720, the generated first magnetic field and second magnetic field may be sensed using a first magnetic field sensor 228 and a second magnetic field sensor 226. These magnetic field sensors 226, 228 may be reed switches, and/or the first magnetic field sensor 228 may sense the first magnetic field when the first magnetic field sensor 228 is within a magnetic field sensing distance from the first magnet 222. The second magnetic field sensor 226 may sense the first magnetic field when the second magnetic field sensor 226 is within a magnetic field sensing distance from the first magnet 222. The first magnetic field sensor 228 and the second magnetic field sensor 226 may be coupled to a dial cover 210. The dial apparatus 207 may rotate about the axis of rotation 209 of the dial apparatus 207. As the dial apparatus 207 rotates, the magnet apparatus 230 may rotate, and the first magnet 222 and second magnet 224 may rotate about the axis of rotation 209.

In block 730, a first signal may be received corresponding to the sensing of the first magnetic field sensor 228, and a second signal may be received corresponding to the sensing of the second magnetic field sensor 226. The first signal and the second signal may be combined to form a two-bit, digital signal. The first signal may correspond to a first bit BIT1, and the second signal may correspond to a second bit BIT2. The digital signal may be generated by the first magnetic field sensor 228 and the second magnetic field sensor 226 based upon the sensed magnetic field.

In block 740, an abnormal condition may be detected based on the received first signal and the received second signal. This abnormal condition may be magnetic tampering, a missing dial cover, and/or a missing dial hand. As discussed above with respect to the nonlimiting exemplary embodiments described in FIGS. 3, 4, 5 and/or 6 in further detail, the abnormal condition may be detected based on a comparison of a first bit BIT1 or first signal and the second bit BIT2 or second signal and/or by recognizing an invalid state. Further, as discussed above, an abnormal condition may be detected using abnormal condition detection logic 621.

Figure 8:
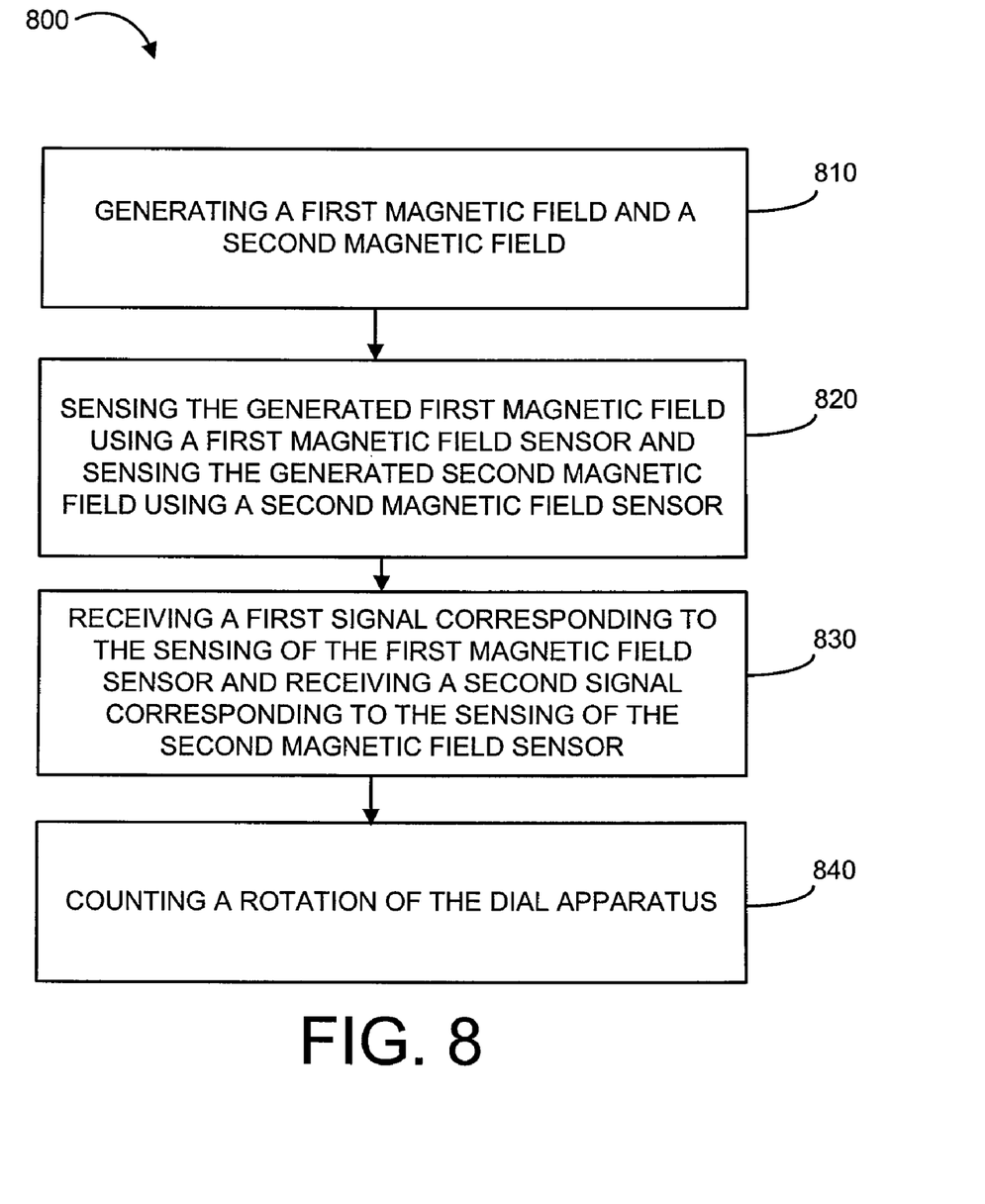
FIG. 8 is a flow chart illustrating another exemplary embodiment of a method for rotation sensing.

FIG. 8 illustrates one exemplary embodiment, among others, of a process 800 for sensing the rotation of a dial apparatus 207 of a metering device 200 shown, for example, in the nonlimiting embodiments illustrated in FIGS. 3, 4, 5, and/or 6. FIG. 8 includes blocks 810, 820, 830 and/or 840. In block 810, a first magnetic field and a second magnetic field are generated. These magnetic fields may be generated using a magnet apparatus 230. The magnet apparatus 230 may be coupled to a dial apparatus 207. The magnet apparatus 230 may comprise a first magnet 222 and a second magnet 224. The first magnet 222 may be positioned offset from the axis of rotation 209. The second magnet 224 may be positioned proximate to the axis of rotation 209 of the dial apparatus 207. The first magnet 222 of the magnet apparatus 230 may generate the first magnetic field, and the second magnet 224 of the magnet apparatus 230 may generate the second magnetic field. The first magnetic field and the second magnetic field may vary according to the rotation of the dial apparatus 207.

In block 820, the generated first magnetic field and second magnetic field may be sensed using a first magnetic field sensor 228 and a second magnetic field sensor 226. These magnetic field sensors 226, 228 may be reed switches, and/or the first magnetic field sensor 228 may sense the first magnetic field when the first magnetic field sensor 228 is within a magnetic field sensing distance from the first magnet 222. The second magnetic field sensor 226 may sense the first magnetic field when the second magnetic field sensor 226 is within a magnetic field sensing distance from the first magnet 222. The first magnetic field sensor 228 and the second magnetic field sensor 226 may be coupled to a dial cover 210. The dial apparatus 207 may rotate about the axis of rotation 209 of the dial apparatus 207. As the dial apparatus 207 rotates, the magnet apparatus 230 may rotate, and the first magnet 222 and second magnet 224 may rotate about the axis of rotation 209.

In block 830, a first signal may be received corresponding to the sensing of the first magnetic field sensor 228, and a second signal may be received corresponding to the sensing of the second magnetic field sensor 226. The first signal and the second signal may be combined to form a two-bit, digital signal. The first signal may correspond to a first bit BIT1, and the second signal may correspond to a second bit BIT2. The digital signal may be generated by the first magnetic field sensor 228 and the second magnetic field sensor 226 based upon the sensed magnetic field.

Figure 9:
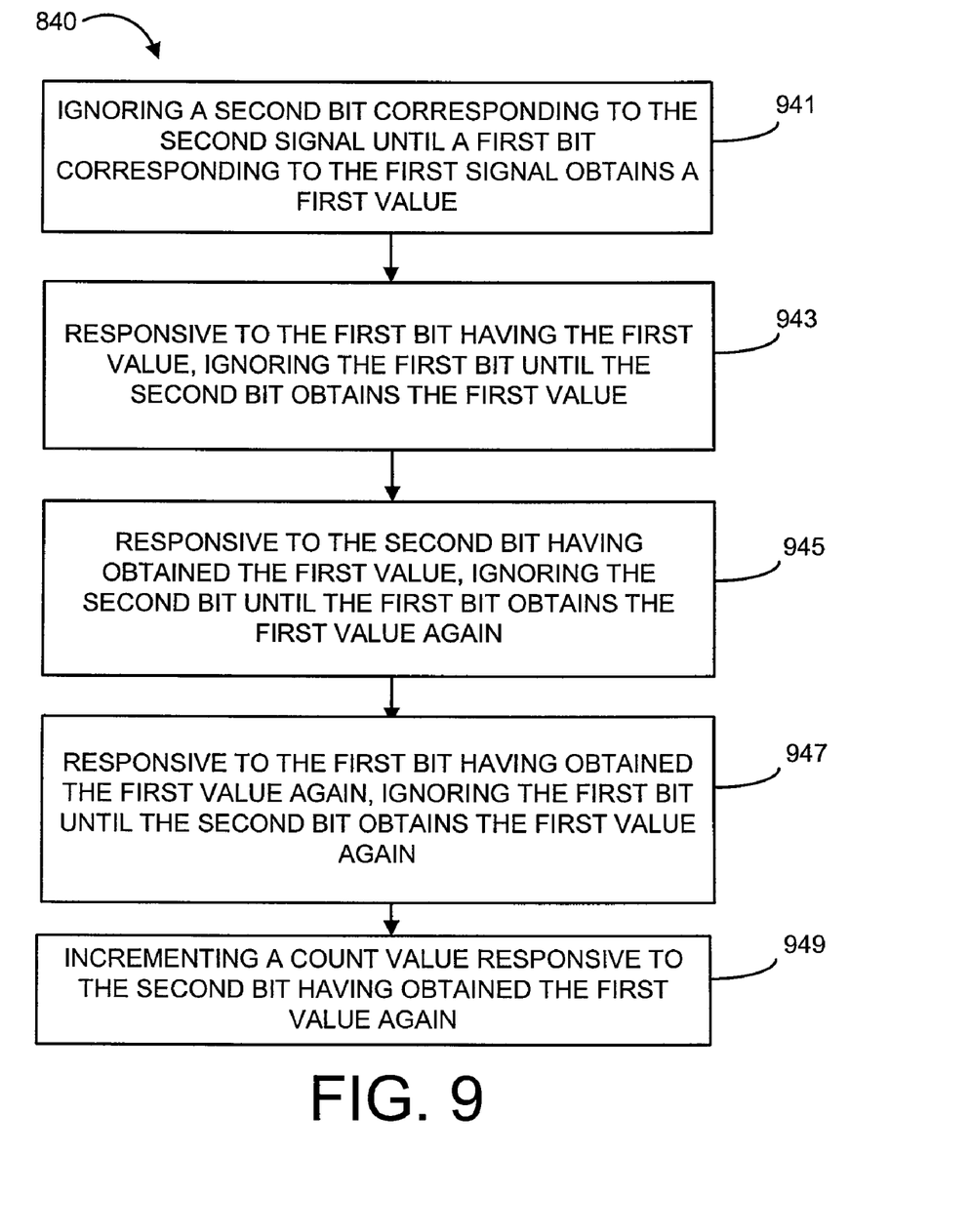
FIG. 9 is a flow chart illustrating an exemplary embodiment of block 840 of FIG. 8.

In block 840, a rotation of the dial apparatus 207 may be counted based on the received first signal and the received second signal. A nonlimiting example of sub-blocks of block 840 are depicted in FIG. 9 and described with respect to FIGS. 3, 4 and 5, as well. Also, in this nonlimiting example, the first signal may correspond to a first bit, and the second signal may correspond to a second bit. In sub-block 941, the second bit (BIT2) may be ignored until the first bit (BIT1) has obtained a predefined value. For example, assuming the first magnetic field sensor 228 and the second magnetic field sensor 226 are normally-open sensors, sub-block 941 may involve waiting for the first bit (BIT1) to obtain a predefined value, such as a logical value of "0." While waiting for the first bit (BIT1) to obtain the predefined value, the second bit (BIT2) may be ignored until the first bit (BIT1) has obtained a predefined value. Responsive to the first bit (BIT1) having obtained the predefined value, in block 943, the first bit (BIT1) may be ignored until the second bit (BIT2) has obtained the predefined value. Responsive to the second bit (BIT2) having obtained the predefined value, in block 945, the second bit (BIT2) may be ignored until the first bit (BIT1) has obtained the predefined value again. Responsive to the first bit (BIT1) having obtained the predefined value again, in block 947, the first bit (BIT1) may be ignored until the second bit (BIT2) has obtained the predefined value again. In block 949, responsive to the second bit (BIT2) having obtained the predefined value again, a count value or number may be incremented.

Figure 10:
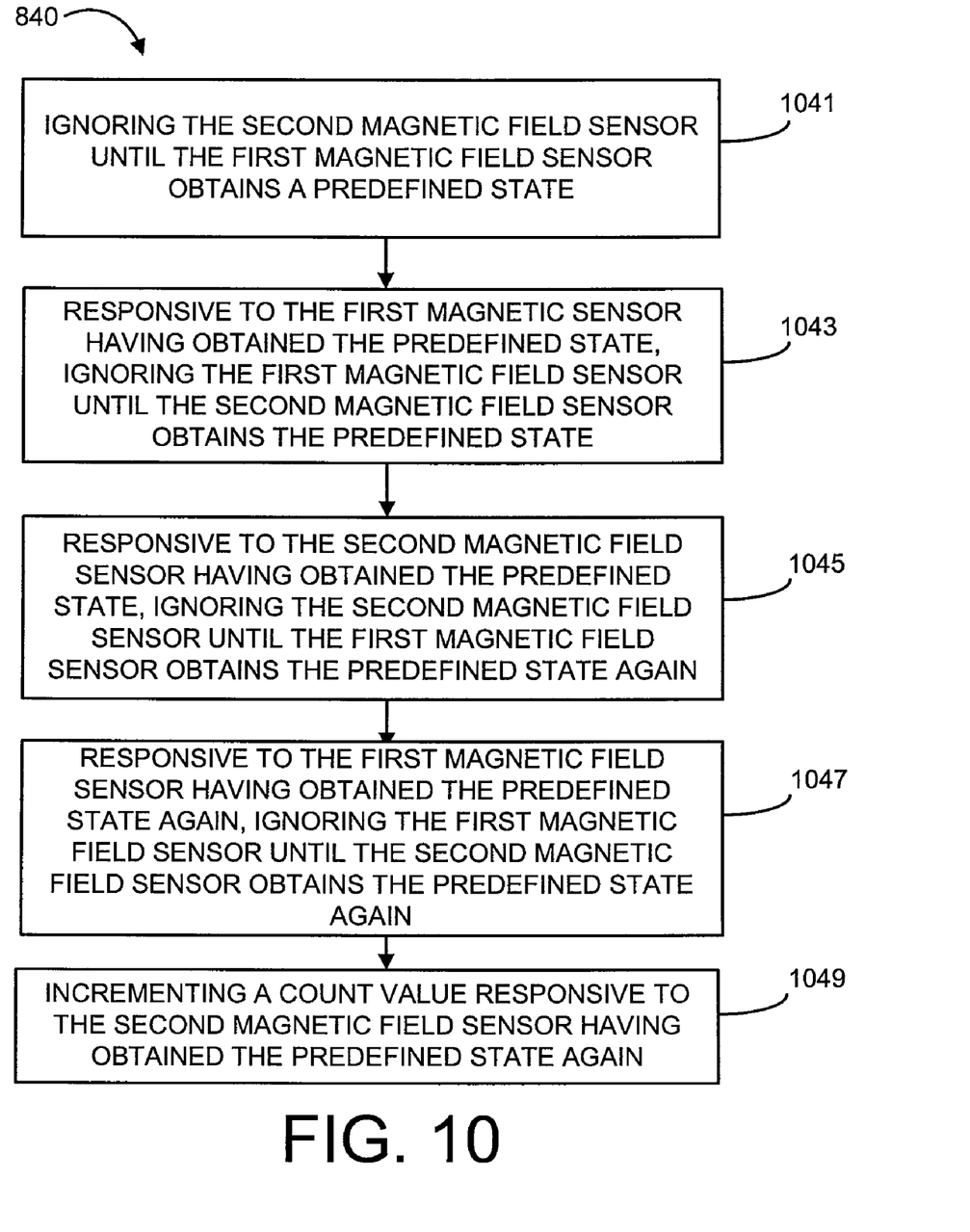
FIG. 10 is a flow chart illustrating another exemplary embodiment of block 840 of FIG. 8.

Another nonlimiting example of sub-blocks of block 840 are depicted in FIG. 10 and described with respect to FIGS. 3, 4 and 5, as well. In sub-block 1041, the second magnetic field sensor 226 may be ignored until the first magnetic field sensor 228 has obtained a predefined state. For example, assuming the first magnetic field sensor 228 and the second magnetic field sensor 226 are normally-open sensors, sub-block 841 may involve waiting for the first magnetic field sensor 228 to obtain a predefined state such as a being "open." While waiting for the first magnetic field sensor 228 to obtain the predefined state, the second magnetic field sensor 226 may be ignored until the first magnetic field sensor 228 has obtained a predefined state. Responsive to the first magnetic field sensor 228 having obtained the predefined state, in block 1043, the first magnetic field sensor 228 may be ignored until the second magnetic field sensor 226 has obtained the predefined state. Responsive to the second magnetic field sensor 226 having obtained the predefined state, in block 1045, the second magnetic field sensor 226 may be ignored until the first magnetic field sensor 228 has obtained the predefined state again. Responsive to the first magnetic field sensor 228 having obtained the predefined state again, in block 1047, the first magnetic field sensor may be ignored until the second magnetic field sensor 226 has obtained the second state again. In block 1049, responsive to the second magnetic field sensor 226 having obtained the predefined state again, a count value may be incremented.

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs, logic or modules listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments of the present invention are merely possible examples of implementations, merely set forth for a clear understanding of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

Therefore, at least the following is claimed:

1. A rotation sensing device, comprising:
a magnetic apparatus comprising a first magnet and a second magnet, the magnet apparatus configured to be mounted to a dial apparatus of a meter;
a first magnetic field sensor configured to be mounted to a dial cover, wherein a distance between the first magnet of the magnet apparatus and the first magnetic field sensor is a function of a magnetic field strength of the first magnet and a sensitivity of the first magnetic field sensor; and
a second magnetic field sensor configured to be mounted to the dial cover, wherein a distance between the second magnetic field sensor and the first magnet is a function of the magnetic field strength of the first magnet and a sensitivity of the second magnetic field sensor, and
wherein the first magnetic field sensor is configured to generate a first signal based upon a sensed magnetic field of the first magnet and the second magnetic field sensor is configured to generate a second signal based upon the sensed magnetic field of the first magnet, and
wherein the dial apparatus of the meter comprises a dial hand, and the magnet apparatus is configured to be coupled to the dial hand of the dial apparatus.

2. The rotation sensing device of claim 1, further comprising a memory component that stores rotation counting logic configured to count a rotation of the dial apparatus based on the first signal and the second signal, wherein the rotation counting logic is further configured to ignore the second signal until the first signal has obtained a predefined value.

3. The rotation sensing device of claim 1, further comprising a memory component that stores logic configured to detect an abnormal condition based on the first signal and the second signal.

4. The rotation sensing device of claim 3, wherein the abnormal condition is selected from the group consisting of the following: magnetic tampering, a missing dial cover, and a missing dial hand.

5. The rotation sensing device of claim 1, wherein the first magnetic field sensor and the second magnetic field sensor are coupled to a printed circuit board that is coupled to the dial cover.

6. The rotation sensing device of claim 1, wherein the magnet apparatus comprises a housing configured to enclose a dial hand.

7. The rotation sensing device of claim 1, wherein the first magnetic field sensor includes a first reed switch, and the second magnetic field sensor includes a second reed switch.

8. The rotation sensing device of claim 1, wherein when the magnet apparatus is mounted to the dial apparatus, the first magnet is positioned on the magnet apparatus closer to an axis of rotation than the second magnet, and the second magnet is positioned on the magnet apparatus closer to a peripheral end of the dial apparatus than the first magnet.

9. A system for rotation sensing, comprising:
a dial apparatus;
a magnet apparatus comprising a first magnet and a second magnet, the magnet apparatus mounted to the dial apparatus;
a first magnetic field sensor mounted to a dial cover, wherein the dial cover covers the dial apparatus, a distance between the first magnet of the magnet apparatus and the first magnetic field sensor is a function of a magnetic field strength of the first magnet and a sensitivity of the first magnetic field sensor, and wherein the first magnetic field sensor is configured to generate a first signal based upon a sensed magnetic field; and
a second magnetic field sensor mounted to the dial cover, wherein a distance between the second magnetic field sensor and the first magnet is a function of the magnetic field strength of the first magnet and a sensitivity of the second magnetic field sensor, wherein the second magnetic field sensor is configured to generate a second signal based upon the sensed magnetic field of the first magnet, and
wherein the dial apparatus comprises a dial hand, and wherein the magnet apparatus is configured to be coupled to the dial hand of the dial apparatus.

10. The system of claim 9, further comprising a memory component that stores logic configured to detect an abnormal condition based on the first signal and the second signal.

11. The system of claim 10, wherein the abnormal condition is selected from the group consisting of the following: magnetic tampering, a missing dial cover, and a missing dial hand.

12. The system of claim 9, wherein the first magnetic field sensor and the second magnetic field sensor are coupled to a printed circuit board that is coupled to the dial cover.

13. The system of claim 9, wherein the magnet apparatus comprises a housing configured to enclose a dial hand.

14. The system of claim 9, wherein the first magnetic field sensor includes a first reed switch, and the second magnetic field sensor includes a second reed switch.

15. The system of claim 9, wherein when the magnet apparatus is mounted to the dial apparatus, the first magnet is positioned on the magnet apparatus closer to an axis of rotation than the second magnet, and the second magnet is positioned on the magnet apparatus closer to a peripheral end of the dial apparatus than the first magnet.

16. The system of claim 9, further comprising a memory component that stores rotation counting logic configured to count a rotation of the dial apparatus based on the first signal and the second signal, wherein the rotation counting logic is further configured to ignore the second signal until the first signal has obtained a predefined value.

17. A method for sensing the rotation of a dial apparatus of a metering device, comprising:
- generating a first magnetic field and a second magnetic field that varies according to the rotation of the dial apparatus, wherein a magnet apparatus comprising a first magnet and a second magnet is mounted to the dial apparatus;
- sensing, using a first magnetic field sensor mounted to a dial cover, the generated first magnetic field when the first magnetic field sensor is within a magnetic field sensing distance of the generated first magnetic field;
- sensing, using a second magnetic field sensor mounted to the dial cover, the generated first magnetic field when the second magnetic field sensor is within the magnetic field sensing distance of the generated first magnetic field;
- receiving a first signal corresponding to the sensing of the first magnetic field sensor; and
- receiving a second signal corresponding to the sensing of the second magnetic field sensor,
- wherein the dial apparatus comprises a dial hand, and wherein the magnet apparatus is configured to be coupled to the dial hand of the dial apparatus.

18. The method of claim 17, further comprising detecting an abnormal condition based on the received first signal and the received second signal, wherein the detected abnormal condition is selected from the group consisting of the following: magnetic tampering, a missing dial cover, and a missing dial hand.

19. The method of claim 17, further comprising counting a rotation of the dial apparatus based on the first signal and the second signal, wherein the counting comprises ignoring the second signal until the first signal has obtained a predefined value.

* * * * *